US009813966B1

(12) United States Patent
Park et al.

(10) Patent No.: US 9,813,966 B1
(45) Date of Patent: Nov. 7, 2017

(54) SUB-CELL POWER ADJUSTMENT

(71) Applicant: Sprint Spectrum LP, Overland Park, KS (US)

(72) Inventors: Sungki Park, Ashburn, VA (US); Saied Kazeminejad, Ashburn, VA (US); Senthil K. Veeraragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 354 days.

(21) Appl. No.: 14/023,785

(22) Filed: Sep. 11, 2013

(51) Int. Cl.
*H04W 36/20* (2009.01)
*H04W 36/30* (2009.01)

(52) U.S. Cl.
CPC .......... *H04W 36/30* (2013.01); *H04W 36/20* (2013.01)

(58) Field of Classification Search
CPC ..... H04W 36/04; H04W 16/32; H04W 36/22; H04W 28/08; H04W 72/04; H04W 72/08; H04W 16/10; H04W 36/20; H04W 36/30
USPC ......................................... 455/436–444, 453
See application file for complete search history.

(56) References Cited

U.S. PATENT DOCUMENTS

| | | | | |
|---|---|---|---|---|
| 8,644,841 B1* | 2/2014 | Oroskar | ............... | H04W 28/08 455/442 |
| 2009/0042595 A1* | 2/2009 | Yavuz et al. | ............... | 455/522 |
| 2009/0215452 A1* | 8/2009 | Balasubramanian | . | H04W 48/16 455/434 |
| 2009/0291690 A1* | 11/2009 | Guvenc | ............... | H04W 16/10 455/444 |
| 2010/0128697 A1* | 5/2010 | Choi-Grogan | ............... | 370/332 |
| 2011/0003597 A1* | 1/2011 | Budic et al. | ............... | 455/450 |
| 2011/0256880 A1* | 10/2011 | Golaup | ............... | H04W 28/08 455/453 |
| 2012/0026972 A1* | 2/2012 | Miao et al. | ............... | 370/331 |
| 2012/0046026 A1* | 2/2012 | Chande | ............... | H04W 24/10 455/422.1 |
| 2012/0113862 A1* | 5/2012 | Santhanam | ......... | H04W 84/045 370/254 |
| 2013/0143572 A1* | 6/2013 | Kang | .................... | H04W 36/22 455/437 |
| 2013/0189997 A1* | 7/2013 | Urie | ............................ | 455/444 |
| 2013/0217407 A1* | 8/2013 | Gerlach | ............... | H04W 28/08 455/453 |
| 2013/0288695 A1* | 10/2013 | Okino | .......................... | 455/450 |
| 2014/0073331 A1* | 3/2014 | Lee | ..................... | H04W 72/048 455/444 |
| 2015/0003275 A1* | 1/2015 | Krishnamurthy | ..... | H04L 1/0026 370/252 |
| 2015/0195843 A1* | 7/2015 | Kalyani | ............. | H04W 72/085 370/252 |

(Continued)

*Primary Examiner* — Khawar Iqbal

(57) ABSTRACT

A first wireless device is served with an access node. The access node has a first coverage area. A second wireless device is served with a sub-cell access node. The sub-cell access node has a second coverage area that is contained within the access node coverage area. Based on the determination to reduce the load on the sub-cell access node, a handover of a wireless device from the sub-cell access node to the access node is caused by reducing the transmit power used by the sub-cell access node. Based on a comparison of a first signal quality indicator associated with a first sub-cell access node to a second signal quality indicator associated with a second sub-cell access node, a transmit power from the first access node is reduced.

6 Claims, 5 Drawing Sheets

(56) References Cited

U.S. PATENT DOCUMENTS

| | | | |
|---|---|---|---|
| 2015/0263836 A1* | 9/2015 | Kim | H04B 7/024 370/329 |
| 2016/0014592 A1* | 1/2016 | Park | H04W 36/04 370/331 |
| 2016/0057708 A1* | 2/2016 | Siomina | H04W 52/243 455/452.2 |
| 2016/0066191 A1* | 3/2016 | Li | H04W 72/082 455/443 |
| 2016/0066315 A1* | 3/2016 | Zhang | H04W 72/1226 370/329 |
| 2016/0088638 A9* | 3/2016 | Damnjanovic | H04B 7/022 455/452.1 |
| 2016/0105853 A1* | 4/2016 | Zhao | H04W 52/244 370/311 |
| 2016/0242042 A1* | 8/2016 | Brisebois | H04W 24/02 |
| 2016/0249364 A1* | 8/2016 | Siomina | H04W 28/048 |
| 2016/0345250 A1* | 11/2016 | Agyapong | H04W 48/16 |
| 2017/0099130 A9* | 4/2017 | Khoryaev | H04W 28/0268 |
| 2017/0163360 A1* | 6/2017 | Raghavan | H04B 17/309 |

* cited by examiner

SUB-CELL POWER ADJUSTMENT

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

In order to provide for better wireless network coverage in certain environments (e.g., indoors or congested areas such as stadiums and arenas), smaller, lower power network access nodes (a.k.a., sub-cells) may be deployed within the coverage area of a higher power access node (a.k.a., macrocell). These sub-cell access nodes may be referred to as, for example, femtocell base stations (femtocells), picocell base stations (picocells), Home evolved Node Bs (HeNBs), and/or Enterprise evolved Node Bs (EeNBs). Since sub-cell access nodes use the same air interface frequencies as the macrocell, and are located within the coverage area of one or more macrocells, sub-cell access node communications can cause interference with communication between wireless devices and the macrocell.

Overview

In an embodiment, a method of operating a communication system includes serving a first plurality of wireless devices with an access node where the access node has a first coverage area. A second plurality of wireless devices are served with a sub-cell access node where the sub-cell access node has a second coverage area that is contained within the access node coverage area. Based on an indicator of the loading of the sub-cell access node, determined to reduce the load on the sub-cell access node. Based on the determination to reduce the load on the sub-cell access node, a handover of a wireless device from the sub-cell access node to the access node is caused by reducing the transmit power used by the sub-cell access node.

In an embodiment, a method of operating a communication system includes serving a first wireless device with an first sub-cell access node. This first sub-cell access node has a coverage area that is within a coverage area of a first access node. A second wireless device is served with a second sub-cell access node. This second sub-cell access node also has a coverage area that is within the coverage area of the first access node. A first signal quality indicator associated with the first sub-cell access node is compared to a second signal quality indicator associated with the second sub-cell access node. Based on this comparison, a transmit power from the first access node is reduced.

In an embodiment, a method of operating a communication system includes determining a location of a sub-cell access node. This sub-cell access node has a location that is within a coverage area of a first access node. The location of the sub-cell access node is determined to be near an edge of the first access node's coverage area. An interference indicator associated with a second access node that is adjacent to the first access node is determined. Based on the location of the sub-cell access node being near the edge of the coverage area, and the interference indicator, a transmit power of the sub-cell access node is reduced.

DETAILED DESCRIPTION

In an embodiment, a macrocell has one or more sub-cell access nodes operating within its coverage area. One of these sub-cell access nodes may become highly loaded or overloaded. To reduce the load on the sub-cell access node, the sub-cell access node reduces its transmit power. This causes one or more of the wireless devices being served by the sub-cell access node to initiate, and complete, a handover from the sub-cell access node to the macrocell. This handover reduces the load on the sub-cell access node.

In an embodiment, a macrocell has at least two sub-cell access nodes operating within its coverage area. Wireless devices being served by these sub-cell access nodes report downlink signal quality indicators (e.g., carrier to interference and noise—CINR). When the signal quality indicator reported by a first wireless device being served by a first sub-cell access node that is near the edge of the macrocell's coverage area is worse than the signal quality indicator reported by a second wireless device being served by a second sub-cell access node that is closer to the macrocell, it indicates that there is interference from a neighboring macrocell. When these signal quality indicators show there is interference from a neighboring macrocell, the macrocell's downlink transmit power is reduced. This reduces the total amount of interference with the second sub-cell access node's communications with the second wireless device.

In an embodiment, a macrocell has a sub-cell access nodes operating within its coverage area. If the location of the sub-cell access node is near the edge of the coverage area of the macrocell, and interference from neighboring cells is not detected (or is below a threshold amount), the transmit power of the sub-cell access node is reduced. This reduces the interference produced by the sub-cell access node with communication between the macrocell and wireless devices not being served by the sub-cell access node (e.g., wireless devices being served by the macrocell or neighboring cells).

Figure 1:
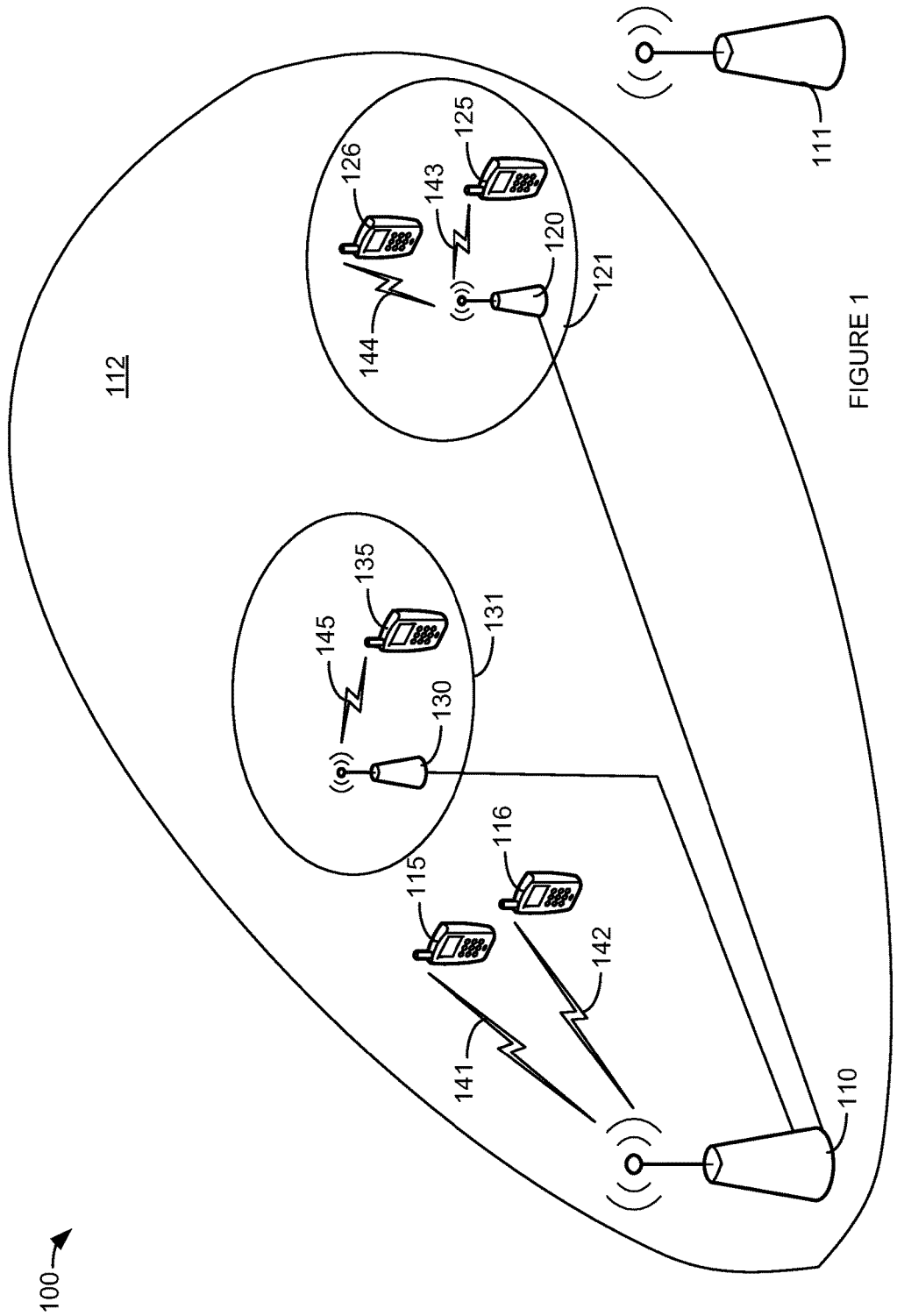
FIG. 1 is a block diagram illustrating a communication system.

FIG. 1 is a block diagram illustrating a communication system. In FIG. 1, communication system 100 comprises access node 110, access node 111, sub-cell access node 120, sub-cell access node 130, wireless device 115, wireless device 116, wireless device 125, wireless device 126, and wireless device 135. Access node 110 is illustrated as having coverage area 112. Sub-cell access node 120 is illustrated as having coverage area 121. Sub-cell access node 130 is illustrated as having coverage area 131. Coverage area 121 is illustrated as being within coverage area 112. Coverage area 131 is illustrated as being within coverage area 112. Sub-cell access node 120 is operatively coupled to access node 110. Sub-cell access node 130 is operatively coupled to access node 130.

Wireless device 115 and wireless device 116 are located within coverage area 112. Wireless device 125 and wireless device 126 are located within coverage area 121. Wireless device 135 is located within coverage area 131. Wireless device 115 is operatively coupled to access node 110 by wireless link 141. Wireless device 116 is operatively coupled to access node 110 by wireless link 142. Wireless device 125 is operatively coupled to sub-cell access node 120 by wireless link 143. Wireless device 126 is operatively coupled to sub-cell access node 120 by wireless link 144. Wireless device 135 is operatively coupled to sub-cell access node 130 by wireless link 145. Thus, it should be understood that wireless device 115 and wireless device 116 are being served by access node 110 (via wireless link 141 and wireless link 142, respectively); wireless device 125 and wireless device 126 are being served by sub-cell access node 120 (via wireless link 143 and wireless link 144, respectively); and, wireless device 135 is being served by sub-cell access node 130 (via wireless link 144).

Access node 110 is a network node capable of providing wireless communication to wireless device 115, wireless device 116, wireless device 125, wireless device 126, and/or wireless device 135. Access node 110 can be, for example, one or more of a base transceiver station, a radio base station, an eNodeB device, or an enhanced eNodeB device. Access node 110 communicates with wireless device 115 via wireless link 141. Access node 110 communicates with wireless device 116 via wireless link 142.

Sub-cell access node 120 is a network node capable of providing wireless communication to wireless device 115, wireless device 116, wireless device 125, wireless device 126, and/or wireless device 135 within a limited coverage area 121 that resides in coverage area 112. Sub-cell access node 120 can be, for example, one or more of a femtocell base stations (femtocell), picocell base station (picocell), Home evolved Node B (HeNB), and/or enterprise evolved Node B (EeNB). Sub-cell access node 120 uses the same air interface as access node 110. Sub-cell access node 120 communicates with wireless device 125 via wireless link 143. Sub-cell access node 120 communicates with wireless device 126 via wireless link 144.

Sub-cell access node 130 is a network node capable of providing wireless communication to wireless device 115, wireless device 116, wireless device 125, wireless device 126, and/or wireless device 135 within a limited coverage area 131 that reside within coverage area 112. Sub-cell access node 130 can be, for example, one or more of a femtocell, picocell, HeNB, and/or EeNB. Sub-cell access node 130 uses the same air interface as access node 110 (and therefore sub-cell access node 120, as well). Sub-cell access node 130 communicates with wireless device 135 via wireless link 145.

Communication system 100 is a communication network that can provide wireless communication to wireless device 115, wireless device 116, wireless device 125, wireless device 126, and/or wireless device 135. Communication system 100 comprises a communication network that can provide communication between access node 110 and sub-cell access node 120. Communication system 100 comprises a communication network that can provide communication between access node 110 and sub-cell access node 130. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 141, wireless link 142, wireless link 143, wireless link 144, and/or wireless link 145 can be a radio frequency, microwave, infrared, or other similar signal. Wireless link 141, wireless link 142, wireless link 143, wireless link 144, and/or wireless link 145 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, sub-cell access node 120, sub-cell access node 130, wireless device 115, wireless device 116, wireless device 125, wireless device 126, and/or wireless device 135 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 115, wireless device 116, wireless device 125, wireless device 126, and/or wireless device 135 may be any device, system, combination of devices, or other such communication platform capable of communicating wirelessly with access node 110, sub-cell access node 120, and sub-cell access node 130. Wireless device 115, wireless device 116, wireless device 125, wireless device 126, and/or wireless device 135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110, sub-cell access node 120, and sub-cell access node 130. Other types of communication platforms are possible.

Access node 110 has at least sub-cell access node 120 operating within its coverage area 112. Sub-cell access node 120 is serving at least wireless device 125 and wireless device 126. Sub-cell access node 120 may become highly loaded or overloaded. Communication system 100 (or sub-cell access node 120, in particular) may determine to reduce the load on sub-cell access node 120. In order to reduce the load on sub-cell access node 120, sub-cell access node 120 reduces its transmit power. In response to receiving a lower power signal via wireless link 144, wireless device 126 can determine that is should initiate a handoff from sub-cell access node 120 to access node 110. Once this handoff is complete, the load on sub-cell access node 120 is reduced. Other wireless devices being served by sub-cell access node 120 (e.g., wireless device 125) may also initiate and be handed of from sub-cell access node 120 to access node 110 thereby further reducing the load on sub-cell access node 120.

In an embodiment, access node 110 serves at least wireless device 115 and wireless device 116. Access node 110 has a coverage area 112 that encompasses sub-cell access node 120 and sub-cell access node 130. The coverage area 121 of sub-cell access node 120 is contained within the coverage area 112 of access node 110. Within this coverage area 121, sub-cell access node 120 may be serving wireless device 125 and wireless device 126.

Communication system 100 (or sub-cell access node 120, in particular) may determine to reduce the load on sub-cell access node 120. Communication system 100 (or sub-cell access node 120, in particular) may determine to reduce the load on sub-cell access node 120 based on an indicator of the load on sub-cell access node 120. This indicator of the load on sub-cell access node 120 may be, or include, for example, the number of wireless devices being served by sub-cell access node 120. In another example, the indicator of the load on sub-cell access node 120 may be, or include, for example, a utilization of the air-interface resources allocated to sub-cell access node 120.

Based on the determination to reduce the load on sub-cell access node 120, sub-cell access node reduces (or is commanded to reduce) its transmit power in order to cause a handoff of one or more of the wireless devices (e.g., wireless device 125 and/or wireless device 126). By reducing its transmit power, sub-cell access node 120 effectively reduces the size of coverage area 121 being served by sub-cell access node 120. When the size of coverage area 121 is reduced, wireless device 126 may now reside outside of coverage area 121.

Once wireless device 126 determines that it is outside of coverage area 121 (i.e., wireless device 126 determines that the conditions for a handover from sub-cell access node 120 to access node 110 have been met), wireless device 126 will initiate a handover from sub-cell access node 120 to access node 110. Once wireless device 126 has been handed over from sub-cell access node 120 to access node 110, the load on sub-cell access node 120 is effectively reduced.

After the handover of wireless device 126 from sub-cell access node 120 to access node 110, sub-cell access node 120 may increase its transmit power. Sub-cell access node 120 may increase its transmit power back to the transmit power level used before the handoff of wireless device 126. Sub-cell access node 120 may increase its transmit power in response to determining that it is no longer heavily loaded or overloaded.

In an embodiment, access node 110 has sub-cell access node 120 and sub-cell access node 130 operating within coverage area 112. Access node 111 is an adjacent (i.e., neighboring) access node to access node 110. In an embodiment, sub-cell access node 120 is closer to the edge of coverage area 112 than sub-cell access node 130. In another embodiment, sub-cell access node 120 is near the edge of coverage area 112 and sub-cell access node 130 is not near the edge of coverage area 112.

Wireless device 125 and wireless device 126, while being served by sub-cell access node 120, report downlink signal quality indicators (e.g., carrier to interference and noise—CINR) to sub-cell access node 120. Wireless device 135 being served by sub-cell access node 130 reports downlink signal quality indicators to sub-cell access node 130. When the signal quality indicator reported by, for example, wireless device 125 (which is being served by sub-cell access node 120 that is near the edge of the access node 110's coverage area 112) is worse than the signal quality indicator reported by wireless device 135 (which is being served sub-cell access node 130 that is closer to access node 110), it indicates that there is interference by a neighboring access node 111. This interference affects the communication between sub-cell access node 120 and the wireless devices it is serving.

When the signal quality indicators reported by wireless device 125, wireless device 126, and/or wireless device 135 show there is interference by a neighboring access node 111, the downlink transmit power of access node 110 is reduced. This reduces the total amount of interference with sub-cell access node 120's communication with at least one of wireless device 125 or wireless device 126. Since sub-cell access node 120 uses the same air interface as access node 110, transmissions by access node 110 interfere with communication between sub-cell access node 120 and wireless device 125 or wireless device 126. Therefore, reducing the transmit power of transmissions by access node 110 that interfere with communication between sub-cell access node 120 and wireless device 125 or wireless device 126 reduces the total amount of interference with sub-cell access node 120's communication.

In an embodiment, wireless device 135 is being served by sub-cell access node 130. Access node 111 is an adjacent (i.e., neighboring) access node to access node 110. As discussed herein, the coverage area 131 of sub-cell access node 130 is within the coverage area 112 of access node 110. Wireless device 125 is being served by sub-cell access node 120. As discussed herein, the coverage area 121 of sub-cell access node 120 is within the coverage area 112 of access node 110. Sub-cell access node 130 may be associated with a signal quality indicator. For example, wireless device 135 may report a signal quality indicator (e.g., CINR) to sub-cell access node 130. Sub-cell access node 130 may report this signal quality indicator to other elements of communication system 100 (e.g., access node 110). Likewise, sub-cell access node 120 may be associated with a signal quality indicator. For example, wireless device 125 may report a signal quality indicator to sub-cell access node 120. Sub-cell access node 120 may report this signal quality indicator to other elements of communication system 100.

In another example, sub-cell access node 130 and sub-cell access node 120 may be associated with signal quality indicators that are measured by sub-cell access node 130 and sub-cell access node 120, respectively. In another example, sub-cell access node 130 may be associated with signal quality indicator that is a combination of a signal quality indicator measured by sub-cell access node 130 and a signal quality indicator measured by wireless device 135. Likewise, sub-cell access node 120 may be associated with signal quality indicator that is a combination of a signal quality indicator measured by sub-cell access node 120 and a signal quality indicator measured by wireless device 125 and/or wireless device 126.

Communication system 100 may compare the signal quality indicators associated with sub-cell access node 130 and sub-cell access node 120. Based on this comparison, communication system 100 may determine that communication between sub-cell access node 120 and wireless device 125 are being interfered with by a second access node (e.g., access node 111). For example, communication system 100 (or sub-cell access node 120, or access node 110, in particular) may compare the CINR indicators associated with access node 120 and access node 130. Based on this comparison, communication system 100 may determine that are being interfered with by a neighboring access node 111. For example, if the CINR associated with sub-cell access node 130 ($CINR^{130}$) is greater than the CINR associated with sub-cell access node 120 ($CINR^{120}$), communication system 100 may determine that sub-cell access node 120 is being interfered with. In other words, if $CINR^{130} > CINR^{120}$ it indicates that sub-cell access node 120 is being interfered with.

Based on the comparison that indicates that sub-cell access node 120 is being interfered with by a second (or neighboring) access node 111, access node 110 reduces its transmit power. As discussed herein, reducing the transmit power of transmissions by access node 110 that interfere with communication between sub-cell access node 120 and wireless device 125 reduces the total amount of interference with the communication between sub-cell access node 120 and wireless device 125.

In an embodiment, access node 110 has sub-cell base station 120 operating within coverage area 112. Access node 111 is an adjacent (i.e., neighboring) access node to access node 110. If the location of the sub-cell base station is determined to be near the edge of the coverage area 112, and interference from a neighboring access node 111 is not detected (or is below a threshold amount), the transmit power of the sub-cell base station 120 is reduced. This reduces the interference produced by the sub-cell base station 120 with communication between access node 110 and wireless device 115 and wireless device 116 (which are not being served by sub-cell access node 120).

In an embodiment, communication system 100 determines a location of sub-cell access node 120. This location is within coverage area 112. The location of sub-cell access node 120 may be determined using, for example, global positioning system (GPS) coordinates or other methods (e.g., received signal timing). In an embodiment, sub-cell access node 120 may make this location determination.

Communication system 100 determines that the location of sub-cell access node 120 is near an edge of coverage are 112. Communication system 100 determines an interference indicator associated with access node 111. For example, as discussed herein, the CINR associated with sub-cell access node 130 ($CINR^{130}$) may be compared with the CINR associated with sub-cell access node 120 ($CINR^{120}$), to determine an interference indicator associated with access node 111. In another example, $CINR^{130}$ and $CINR^{120}$ may be mathematically manipulated (e.g., subtracted) to determine an interference indicator associated with access node 111. In another example, sub-cell access node 120 may determine an interference indicator associated with access node 111 based on a signal (or signal strength) received from access node 111 by sub-cell access node 120 or wireless device 125.

Based on the location of sub-cell access node 120, and the interference indicator associated with access node 111, communication system 100 reduces the transmit power of sub-cell access node 120. This reduces the interference produced by sub-cell 120 with communication between access node 110 and wireless device 115 and wireless device 116 which are not being served by the sub-cell base access node 120.

Figure 2:
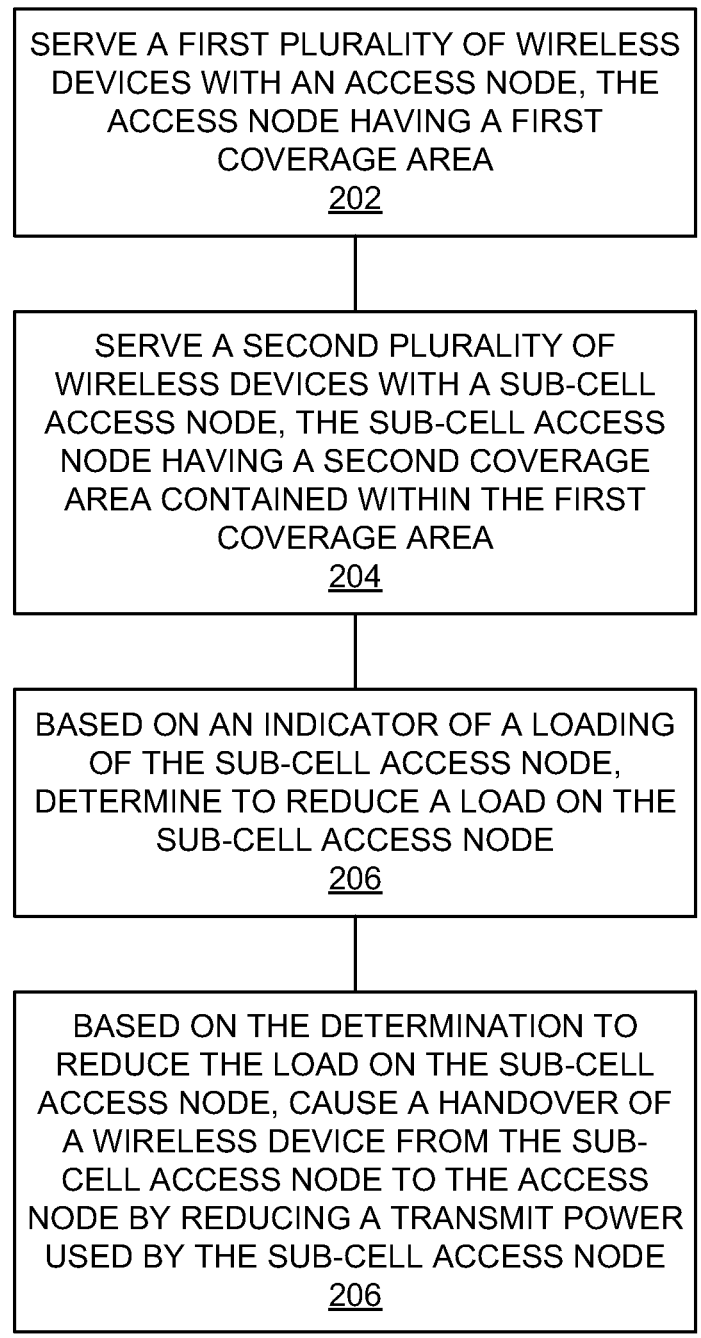
FIG. 2 is a flowchart illustrating a method of operating a communication system.

FIG. 2 is a flowchart illustrating a method of operating a communication system. The steps illustrated in FIG. 2, may be performed by one or more elements of communication system 100. A first plurality of wireless devices is served with an access node that has a first coverage area (202). For example, wireless device 115 and wireless device 116 may be served by access node 110. Access node 110 has coverage area 112. A second plurality of wireless devices is served with a sub-cell access node that has a second coverage area contained within the first coverage area (204). For example, wireless device 125 and wireless device 126 may be served by sub-cell access node 120. Sub-cell access node has a coverage area 121 that at least overlaps coverage area 112.

Based on an indicator of a loading of the sub-cell access node, it is determined to reduce a load on the sub-cell access node (206). For example, based on a loading of sub-cell access node 120, sub-cell access node 120 may determine that the load on sub-cell access node 120 should be reduced. Based on the determination to reduce the load on the sub-cell access node, a handover of a wireless device from the sub-cell access node to the access node is caused by reducing a transmit power used by the sub-cell access node (206). For example, based on sub-cell access node 120's determination to reduce the load on sub-cell access node 120, sub-cell access node 120 may reduce downlink transmit power. As a result of receiving reduced downlink signal strength, wireless device 125 may initiate a handover that causes wireless device 125 to be handed over from sub-cell access node 120 to access node 110.

Figure 3:
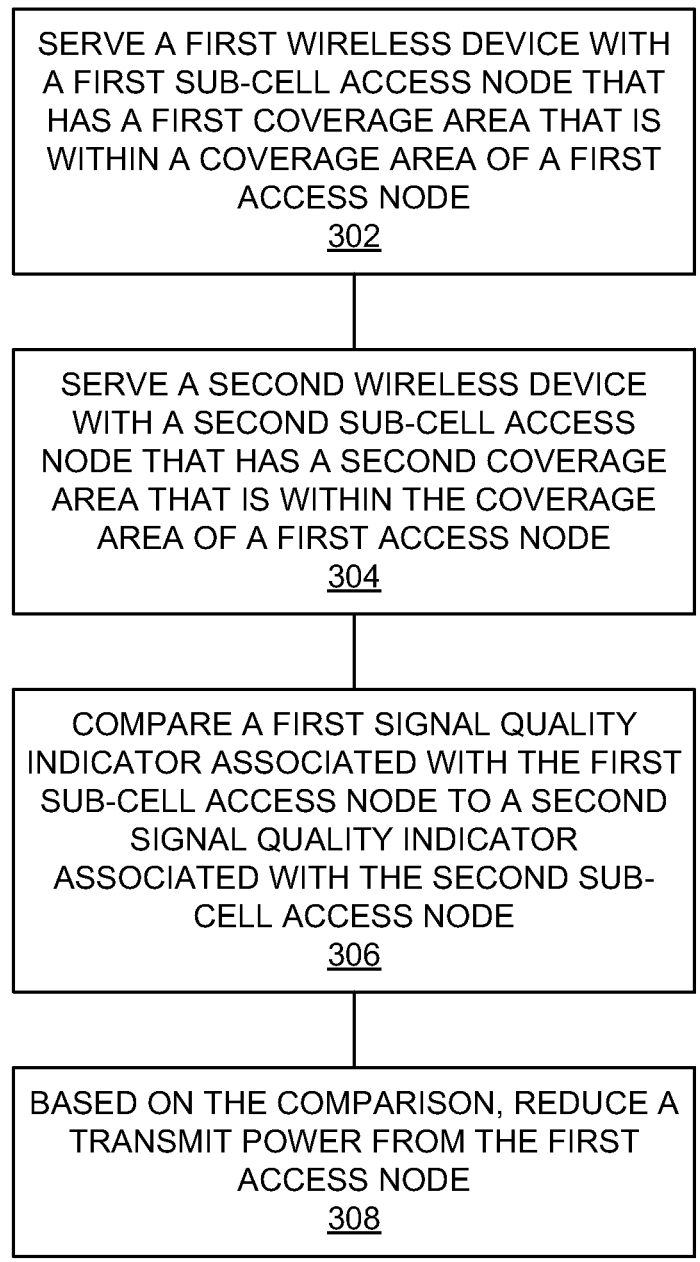
FIG. 3 is a flowchart illustrating a method of operating a communication system to reduce interference.

FIG. 3 is a flowchart illustrating a method of operating a communication system to reduce interference. The steps illustrated in FIG. 3, may be performed by one or more elements of communication system 100. A first wireless device is served with a first sub-cell access node that has a first coverage area that is within a coverage area of a first access node (302). For example, wireless device 126 may be served by sub-cell access node 120. Sub-cell access node 120 has a coverage area 121 that is within the coverage area 112 of access node 110. A second wireless device is served with a second sub-cell access node that has a second coverage area that is within the coverage area of the first access node (304). For example, wireless device 135 may be served by sub-cell access node 130. Sub-cell access node 130 has a coverage area 131 that is within the coverage area 112 of access node 110.

A first signal quality indicator associated with the first sub-cell access node is compared to a second signal quality indicator associated with the second sub-cell access node (306). For example, a CINR indicator associated with sub-cell access node 120 may be compared to a CINR indicator associated with sub-cell access node 130. If the CINR indicator associated with sub-cell access node 120 is less than the CINR indicator associated with sub-cell access node 130, it indicates that sub-cell access node 120 is being interfered with. If the CINR indicator associated with sub-cell access node 120 is less than the CINR indicator associated with sub-cell access node 130, it may indicate that sub-cell access node 120 is being interfered with by a neighboring access node 111.

Based on the comparison, a transmit power from the first access node is reduced (308). For example, based on a comparison of the CINR indicator associated with sub-cell access node 120 to a CINR indicator associated with sub-cell access node 130, access node 110 may reduce a transmit power. Based on a comparison of the CINR indicator associated with sub-cell access node 120 to a CINR indicator associated with sub-cell access node 130, access node 110 may reduce its downlink transmit power.

Figure 4:
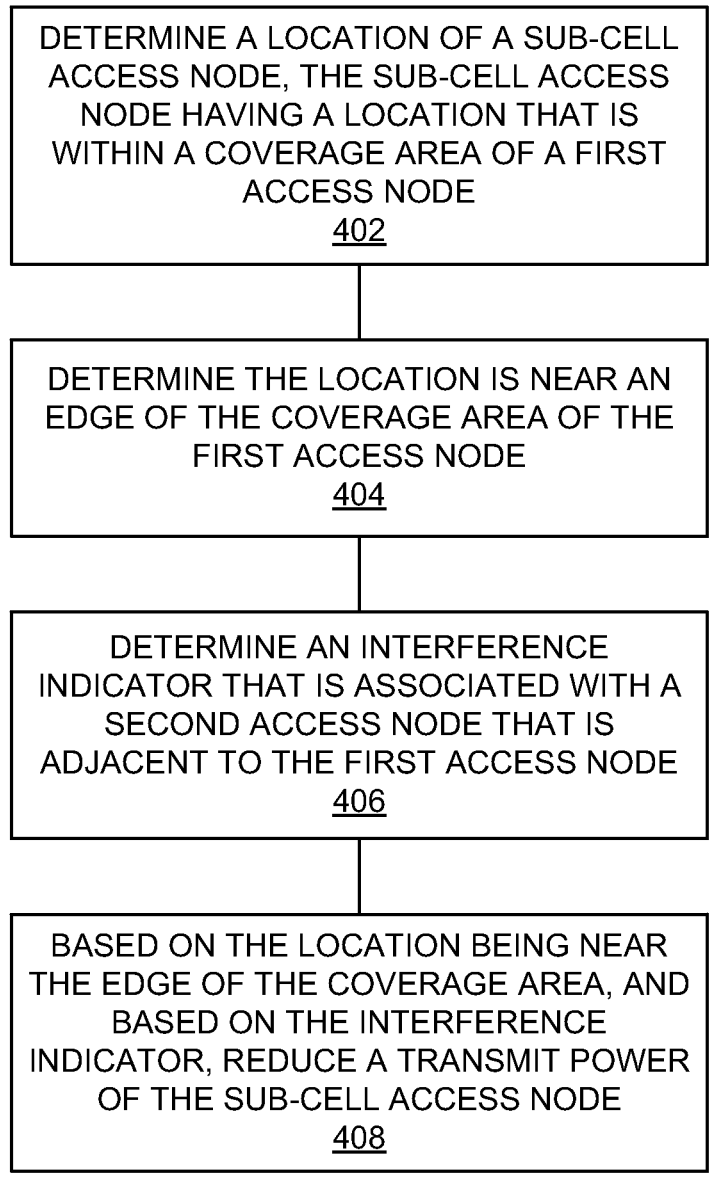
FIG. 4 is a flowchart illustrating a method of reducing interference in a communication system.

FIG. 4 is a flowchart illustrating a method of reducing interference in a communication system. The steps illustrated in FIG. 4 may be performed by one or more elements of communication system 100. A location of a sub-cell access node having a location that is within a coverage area of a first access node is determined (402). For example, sub-cell access node 120 may determine sub-cell access node 120's location and report this location to access node 110. The location of sub-cell access node 120 is within coverage area 112.

The location is determined to be near an edge of the coverage area of the first access node (404). For example, the location of sub-cell access node 120 may be determined to be near an edge of coverage area 112. In another example, the location of sub-cell access node 120 may be determined to be relatively near a neighboring access node 111. An interference indicator that is associated with a second access node that is adjacent to the first access node is determined (406). For example, sub-cell access node 120 may measure a signal coming from neighboring access node 111. This measurement may indicate an amount of interference that sub-cell access node 120 is experiencing as a result of transmissions from access node 111.

Based on the location being near the edge of the coverage area, and based on the interference indicator, a transmit power of the sub-cell access node is reduced (408). For example, based on the location of sub-cell access node 120, and the amount of interference that sub-cell access node 120 is experiencing as a result of transmissions from access node 111, the transmit power of sub-cell access node 120 may be reduced.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, access node 111, sub-cell access node 120, sub-cell access node 130, wireless device 115, wireless device 116, wireless device 125, wireless device 126, and/or wireless device 135.

Figure 5:
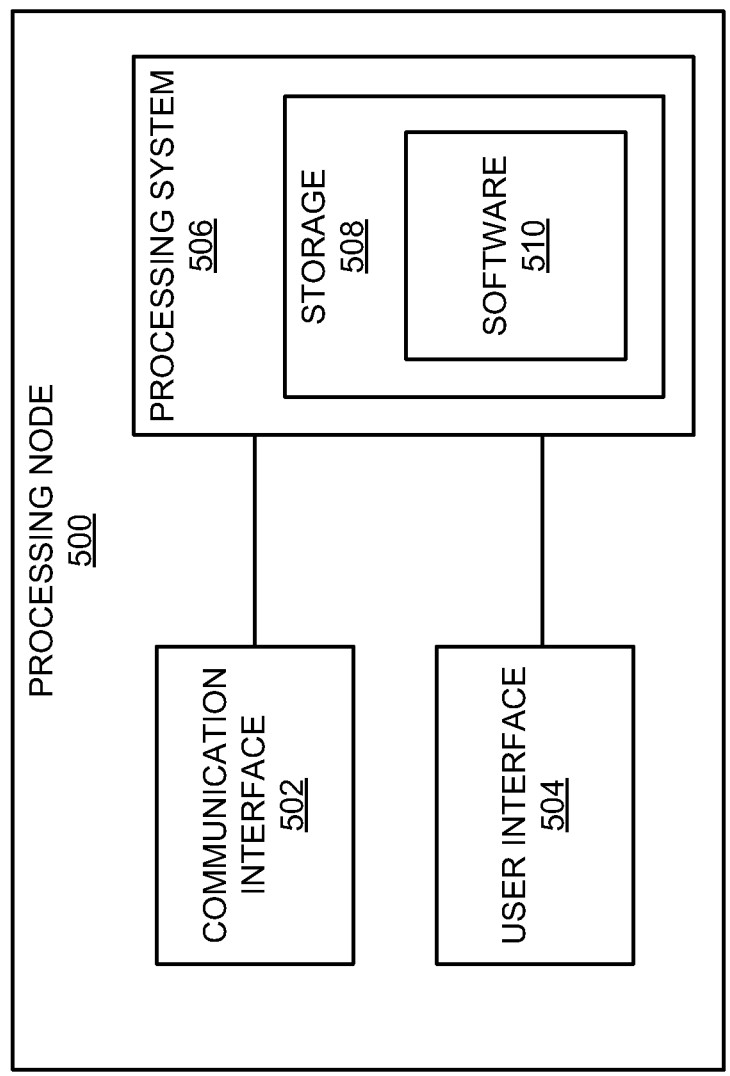
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 110, access node 111, sub-cell access node 120, and/or sub-cell access node 130. Processing node 500 can also be an adjunct or component of a network element, such as an element of access node 110, access node 111, sub-cell access node 120, sub-cell access node 130, wireless device 115, wireless device 116, wireless device 125, wireless device 126, wireless device 135, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:
1. A method of operating a communication system, comprising:

serving a first wireless device with a first sub-cell access node, the first sub-cell access node having a first coverage area that is within a coverage area of a first macro-cell access node;
serving a second wireless device with a second sub-cell access node, the second sub-cell access node having a second coverage area that is within the coverage area of the first macro-cell access node;
comparing a first signal quality indicator associated with the first sub-cell access node to a second signal quality indicator associated with the second sub-cell access node;
based on the comparison, determining that a second macro-cell access node is interfering with communication between the second sub-cell access node and the second wireless device; and
reducing a transmit power from the first macro-cell access node, wherein the transmit power from the first macro-cell access node is reduced when the first signal quality indicator associated with the first sub-cell access node indicates better signal quality than the second signal quality indicator associated with the second sub-cell access node by a threshold amount.

2. The method of claim 1, wherein the first signal quality indicator and the second signal quality indicator are associated with a carrier-to-interference-and-noise ratio.

3. The method of claim 1, wherein the first signal quality indicator is measured by the first wireless device and the second signal quality indicator is measured by the second wireless device.

4. The method of claim 1, wherein the first signal quality indicator is measured by the first sub-cell access node and the second signal quality indicator is measured by the second sub-cell access node.

5. The method of claim 1, wherein the first signal quality indicator is based on a first sub-cell measured signal quality indicator and a first wireless device measured signal quality indicator and the second signal quality indicator is based on a second sub-cell measured signal quality indicator and a second wireless device measured signal quality indicator.

6. The method of claim 1, wherein the transmit power from the first macro-cell access node is reduced when the first signal quality indicator associated with the first sub-cell access node indicates better signal quality than the second signal quality indicator associated with the second sub-cell access node.

* * * * *